United States Patent [19]

Behl et al.

[11] Patent Number: 5,114,805
[45] Date of Patent: May 19, 1992

[54] HIGH TEMPERATURE MOLTEN SALT ELECTROCHEMICAL CELL

[75] Inventors: Wishvender K. Behl, Ocean; Edward J. Plichta, Howell, both of N.J.

[73] Assignee: The United States of America as represented by the Secretary of the Army, Washington, D.C.

[21] Appl. No.: 561,411

[22] Filed: Jul. 30, 1990

[51] Int. Cl.[5] .................. H01M 6/36; H01M 4/58
[52] U.S. Cl. .................................. 429/112; 429/221; 429/223; 429/224; 429/218
[58] Field of Search .............. 429/112, 221, 223, 224, 429/218

[56] References Cited

U.S. PATENT DOCUMENTS

| | | | |
|---|---|---|---|
| 3,677,822 | 7/1972 | Bush | 429/112 |
| 3,751,298 | 8/1973 | Senderoff | 429/112 |

Primary Examiner—Anthony McFarlane
Assistant Examiner—Nhat D. Phan
Attorney, Agent, or Firm—Michael Zelenka; Roy E. Gordon

[57] ABSTRACT

A high temperature molten salt electrochemical cell including an electrode stack assembly sealed in a containment vessel is provided for use in testing experimental high temperature molten salt battery chemistries in which the electrode stack assembly uses a spring loaded design that maintains electrical contact between current collectors and electrodes by compensating for the electrode contraction and expansions observed during the heating and cooling cycles.

13 Claims, 1 Drawing Sheet

HIGH TEMPERATURE MOLTEN SALT ELECTROCHEMICAL CELL

GOVERNMENT INTEREST

The invention described herein may be manufactured, used, and licensed by or for the Government for governmental purposes without the payment to us of any royalty thereon.

FIELD OF INVENTION

This invention relates in general to a high temperature molten salt electrochemical cell, and in particular to such a cell for use in testing experimental high temperature molten salt battery chemistries.

BACKGROUND OF THE INVENTION

Heretofore, high temperature molten salt electrochemical cells have had problems with electrode contact during electrochemical cell testing throughout the heating and cooling cycles. Moreover, there have been difficulties with the insulation at the edges of the electrodes causing cell shorting. These difficulties have necessitated the need for testing experimental molten salt electrochemical cells in cumbersome dry boxes or environmentally controlled dry rooms.

SUMMARY OF THE INVENTION

The general object of this invention is to provide a high temperature molten salt electrochemical cell for use in testing experimental high temperature molten salt battery chemistries. A more specific object of the invention is to provide such a cell in which the aforementioned difficulties are overcome.

It has now been found that the aforementioned objects can be attained by providing a high temperature molten salt electrochemical cell including an electrode stack assembly sealed in a containment vessel for use in testing experimental high temperature molten salt electrochemical cell chemistries wherein the electrode stack assembly uses a spring loaded design that maintains the electrical contact between the current collectors and the electrodes by compensating for the electrode contractions and expansions observed during the heating and cooling cycles. In addition, the design provides insulation at the edges of the electrodes by means of a ceramic bushing comprised of boron nitride, thereby reducing electrochemical cell shorting due to electrochemical edge effects.

DETAILED DESCRIPTION OF THE INVENTION

Figure 1:
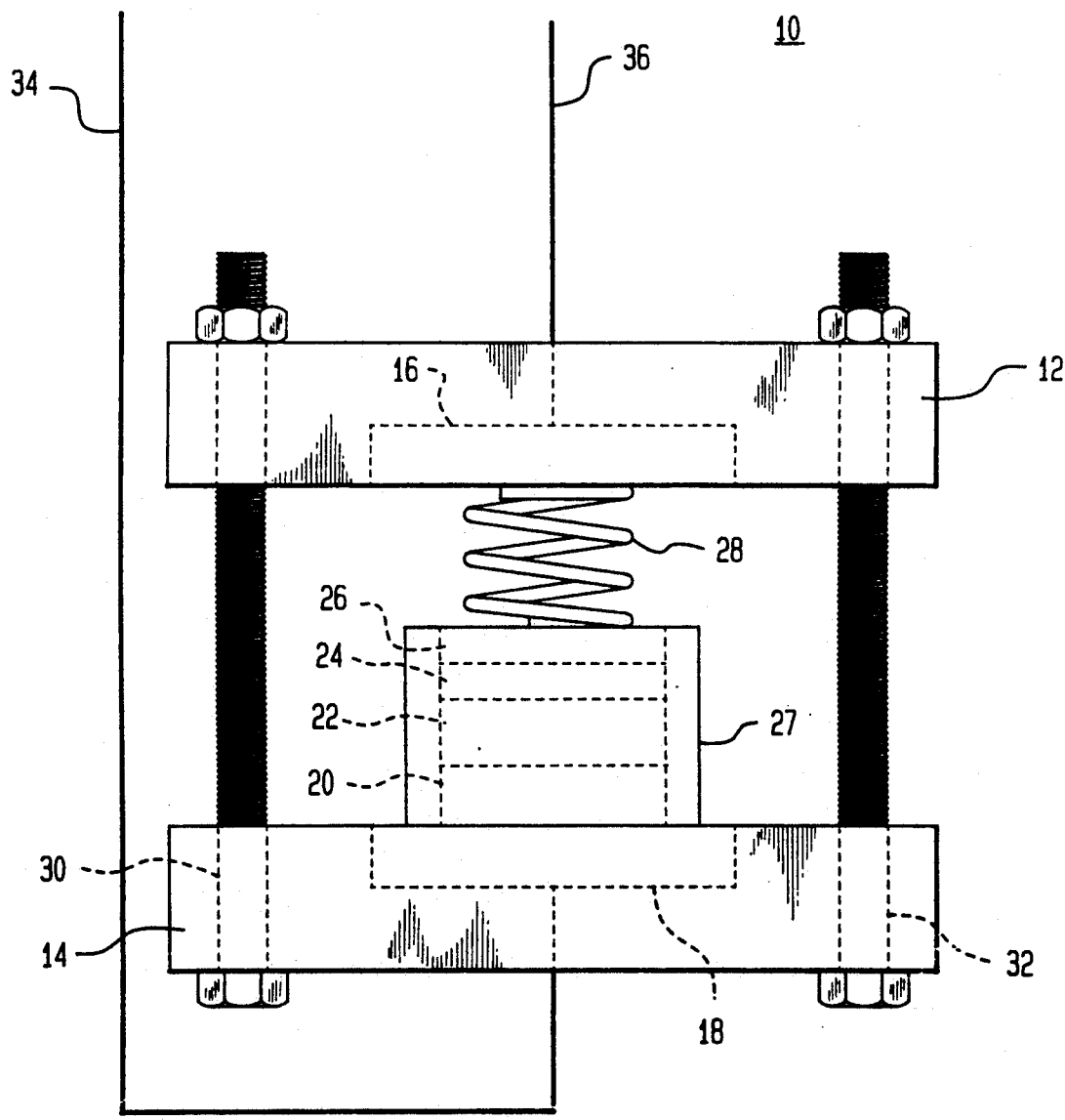
FIG. 1 is a side view of the electrode stack assembly, showing the spring loaded design.

Referring to FIG. 1 the electrode stack assembly, 10, includes two spaced apart boron nitride plates, 12 and 14 respectively. Each plate is (1.25 in. $\times$ 1.25 in. $\times$ 0.25 in.) and affixed with 0.75 in. diameter molybdenum current collector disks, 16 and 18 respectively. Electrode pellets, including an anode pellet, 20, a separator pellet, 22, over the anode pellet, 20, a cathode pellet, 24, over separator pellet, 22, and a graphite current collector disk, 26, over the cathode pellet, 24, are stacked in between the boron nitride plates 12 and 14 along with a high temperature stainless steel compression spring, 28. Stainless steel fastening screws 30, 32 are used to compress the spring loaded cell stack. The compression spring, 28 is used to maintain electrical contact of the electrode pellets 20, 24, with the molybdenum current collector disks 16 and 18 and compensate for any shrinkage of the pellets due to the melting of the eutectic electrolyte when the cell is heated to the working temperature of 400° C. The electrode stack 20, 22, 24 and graphite disk 26 is housed inside of a boron nitride bushing, 27 that maintains the electrode integrity once the electrolyte is fluid and acts to reduce electrical shorting of the cell due to electrochemical edge effects. Molybdenum current collector leads 34, 36 are also provided for electrode stack assembly 10. The cathode pellet 24 is prepared by pressing an 0.3 gram mixture of 85 weight percent active material and 15 weight percent electrolyte to 2000 pounds pressure using a ½ inch diameter die. The separator pellet 22 is prepared in the same manner from a 0.6 gram mixture of 35 weight percent MgO and 65 weight percent electrolyte. The anode pellet 20 is prepared similarly, by pressing a 0.3 gram mixture of 20 weight percent lithium and 80 weight percent aluminum alloy to 1500 pounds pressure.

The stacked cell assembly 10 can be used in any inert gas atmosphere that can be heated by external means to a temperature at least 50 to 100 degrees above the temperature of the melting point of the electrolyte. Such an atmosphere can be provided by sealing the stacked cell assembly in a sealed pyrex glass containment vessel. The containment vessel should be stable over the cells operating temperature range as well as being resistant to chemical attack by the cell components. Other suitable containment materials are quartz, ceramics, stainless steels as well as other high temperature metals and alloys.

The cell design is suitable for use with any molten salt electrochemical cell where the electrolyte includes, but is not limited, to any alkali-halide as for example LiCl, LiBr, LiF, KCl, KBr, KF, NaCl, NaBr, and NaF, alkali nitrate, alkali-carbonates, and mixtures thereof. The negative electrode may include but is not limited to the use of any alkali metal as for example Li, Na, K, Rb, Cs and Fr and their alloys with Al and/or Si. The positive electrode includes but is not limited to transition metal sulfides such as $FeS_2$, $FeS_2$, $CoS_2$, $NiS_2$, $CrS_2$, $TiS_2$, $TaS_2$, $Nbs_2$, $ZrS_2$, $HfS_2$, $VS_2$, $V_2S_3$, $V_2S_5$, CuS and ZrS, transition metal oxides such as $VO_2$, $V_2O_5$, $V_2O_3$, VO, $CrO_2$, $Cr_2O_3$, $Mn_2O_3$, $MnO_2$, $Mn_3O_4$, MnO, $Fe_2O_3$, $Fe_3O_4$, CoO, $CoNiO_2$, $LiCoO_2$, $LiNiO_2$, $LiFeO_2$, $LiMnO_2$, $LiCo_xNi_{1-x}O_2$, $NiO_2$, NiO, CuO, $Cu_2O$, and ZnO and other compounds containing F, Cl, Br, I, Se and Te. The cell separator includes but is not limited to the use of MgO, boron nitride, $Y_2O_3$, $ZrO_2$, BeO, AlN, $Li_3N$, $Si_3N_4$, and mixtures thereof. Current collector materials may include but are not limited to the use of metals such as Mo, Al, Cu, Co, Pb, graphite, carbon or other such materials in either powder, plate, sheet, or grit form that enables the conduction of current to pass from the internal cell stack to an external electrical connection. Electrically insulating materials include the use of boron nitride, aluminum oxide, ceramics, asbestos, or any other materials or combination thereof that resist the conduction of electricity.

We wish it to be understood that we do not desire to be limited to the exact details as described for obvious modifications will occur to a person skilled in the art.

What is claimed is:

1. A high temperature molten salt electrochemical cell, said cell comprising an electrode stack assembly sealed in a containment vessel, the electrode stack assembly including an electrode stack housed inside of a boron nitrite bushing, the electrode stack including a negative electrode, a separator disk atop the negative electrode, a positive electrode atop the separator disk, and a graphite current collector disk atop the positive electrode, the positive and negative electrodes being maintained under constant compression by means of a high temperature stainless steel compression spring and stainless steel assembly screws positioned external to the electrode stack to vary the degree of cell compression applied to the electrode stack by the spring.

2. A high temperature molten salt electrochemical cell according to claim 1 wherein the containment vessel is a pyrex glass containment vessel.

3. A high temperature molten salt electrochemical cell according to claim 1 wherein the positive electrode is prepared by pressing an 0.3 gram mixture of about 85 weight percent active material and about 15 weight percent electrolyte to about 2000 pounds pressure using a ½ inch diameter die.

4. A high temperature molten salt electrochemical cell according to claim 1 wherein the separator disk is prepared by pressing an 0.6 gram mixture of about 35 weight percent MgO and about 65 weight percent electrolyte to about 2000 pounds pressure using a ½ inch diameter die.

5. A high temperature molten salt electrochemical cell according to claim 1 wherein the negative electrode is prepared by pressing an 0.3 gram mixture of about 20 weight percent lithium and about 80 weight percent aluminum alloy to about 1500 pounds pressure using a ½ inch diameter die.

6. A high temperature molten salt electrochemical cell according to claim 3 wherein the active material of the positive electrode is $LiNiO_2$.

7. A high temperature molten salt electrochemical cell according to claim 3 wherein the active material of the positive electrode is $NiO_2$.

8. A high temperature molten salt electrochemical cell according to claim 3 wherein the active material of the positive electrode is a mixture of CoO and $Li_2O$ and where the ratio of Li to Co is 1.

9. A high temperature molten salt electrochemical cell according to claim 3 wherein the active material of the positive electrode is a mixture of Co and $Li_2O$ where the molar ratio of Li to Co is 1.

10. A high temperature molten salt electrochemical cell according to claim 3 wherein the active material of the positive electrode is $Co_3O_4$.

11. A high temperature molten salt electrochemical cell according to claim 3 wherein the active material of the positive electrode is $LiFeO_2$.

12. A high temperature molten salt electrochemical cell according to claim 3 wherein the active material of the positive electrode is $LiMnO_2$.

13. A high temperature molten salt electrochemical cell according to claim 3 wherein the active material of the positive electrode is $CoNiO_2$.

* * * * *